US007155240B2

(12) United States Patent
Atkinson et al.

(10) Patent No.: US 7,155,240 B2
(45) Date of Patent: Dec. 26, 2006

(54) METHOD OF DETERMINING THE POSITION OF A TARGET USING TRANSMITTERS OF OPPORTUNITY

(75) Inventors: Simon John Atkinson, Romsey (GB); Adam Alexander Baker, Southampton (GB); Bryan Stephen Rickett, Romsey (GB); Christopher Nigel Smith, Romsey (GB); Robert John Weedon, Romsey (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 10/485,519

(22) PCT Filed: Jun. 27, 2002

(86) PCT No.: PCT/EP02/07115

§ 371 (c)(1),
(2), (4) Date: Oct. 15, 2004

(87) PCT Pub. No.: WO03/014764

PCT Pub. Date: Feb. 20, 2003

(65) Prior Publication Data

US 2005/0057395 A1 Mar. 17, 2005

(30) Foreign Application Priority Data

Aug. 3, 2001 (GB) ................................ 0118993.5

(51) Int. Cl.
*H04Q 7/20* (2006.01)

(52) U.S. Cl. .............................. 455/456.2; 455/456.1; 455/456.5; 342/357.1; 342/450

(58) Field of Classification Search ............ 455/456.1, 455/456.2, 456.3, 456.4, 456.5, 456.6; 342/387, 342/453, 464, 465, 356, 357.01, 357.06, 342/357.1, 450

See application file for complete search history.

(56) References Cited

U.S. PATENT DOCUMENTS 5,410,314 A * 4/1995 Frush et al. .............. 342/26 D
5,596,330 A * 1/1997 Yokev et al. ............... 342/387
6,161,018 A * 12/2000 Reed et al. .............. 455/456.1
6,201,499 B1 * 3/2001 Hawkes et al. ............. 342/387

(Continued)

FOREIGN PATENT DOCUMENTS

EP 0 178 460 A1 4/1986

(Continued)

OTHER PUBLICATIONS

"Multistatic Radar", Understanding Radar Systems, Chapter Thirteen, pp. 271-285, no date listed.

(Continued)

*Primary Examiner*—Jean Gelin
*Assistant Examiner*—KAmaran Afshar
(74) *Attorney, Agent, or Firm*—Crowell & Moring LLP

(57) ABSTRACT

A method of determining the position of a target comprising the steps of: providing a transmitter or a plurality of transmitters to transmit a signal to the target, providing a receiver or a plurality of receivers to receive signals reflected from said target. Determining the time of arrival information of said reflected signal at the or each receiver; using information pertaining to the position of the or each receiver and/or the or each transmitter and with the information obtained determining the target position. Preferably the signal includes a modulated or coded portion unique to the transmitter; and said signal portion is associated with the or each particular transmitter by virtue of said signal portion. The signal maybe a mobile phone transmission, DAB, digital TV, digital Radio or digital satellite transmissions.

8 Claims, 4 Drawing Sheets

U.S. PATENT DOCUMENTS

| | | | | |
|---|---|---|---|---|
| 6,219,345 | B1 * | 4/2001 | Clark et al. | 370/337 |
| 6,232,922 | B1 * | 5/2001 | McIntosh | 342/453 |
| 6,310,576 | B1 * | 10/2001 | Johnson | 342/465 |
| 6,356,763 | B1 * | 3/2002 | Kangas et al. | 455/456.1 |
| 6,438,380 | B1 * | 8/2002 | Bi et al. | 455/456.1 |
| 6,539,229 | B1 * | 3/2003 | Ali | 455/456.1 |
| 6,587,080 | B1 * | 7/2003 | De Champlain et al. | 342/450 |
| 6,608,593 | B1 * | 8/2003 | Holt | 342/450 |
| 6,681,099 | B1 * | 1/2004 | Keranen et al. | 455/456.1 |
| 6,683,569 | B1 * | 1/2004 | Collier et al. | 342/465 |
| 6,710,743 | B1 * | 3/2004 | Benner et al. | 342/453 |
| 6,771,625 | B1 * | 8/2004 | Beal | 455/457 |
| 6,845,240 | B1 * | 1/2005 | Carlson et al. | 455/456.2 |
| 6,941,144 | B1 * | 9/2005 | Stein | 455/456.1 |
| 2005/0280578 | A1 * | 12/2005 | Boyd | 342/465 |
| 2006/0161329 | A1 * | 7/2006 | Crane et al. | 701/93 |

FOREIGN PATENT DOCUMENTS

| | | |
|---|---|---|
| EP | 0 681 190 A1 | 11/1995 |
| GB | 1 529 304 | 10/1978 |
| GB | 1 529 381 | 10/1978 |
| GB | 2 236 445 A | 4/1991 |
| GB | 2 242 328 A | 9/1991 |
| GB | 2 251 351 A | 7/1992 |
| GB | 2 333 198 A | 7/1999 |
| WO | WO 01/22117 A1 | 3/2001 |

OTHER PUBLICATIONS

T.C. Cheston et al., "Phased Array Radar Antennas", Radar Handbook, Chapher 7, pp. 7.1-7.82, no date listed.

"Reflected glory", The Economist, Feb. 13, 1999, p. 119.

Ulf Ivarson, "Multistatic radars promise stealth detection", International Defense Review, Jul. 1993, p. 584, no date listed.

"Communications, Radar and Signal Processing", IEE Proceedings—F, vol. 133, Part F, No. 7,. Dec. 1986, pp. 585-673.

International Search Report dated Oct. 29, 2002 (Three (3) pages).

UK Search Report dated May 20, 2002 (Two (2) pages).

* cited by examiner

METHOD OF DETERMINING THE POSITION OF A TARGET USING TRANSMITTERS OF OPPORTUNITY

BACKGROUND OF THE INVENTION

The use of radars to detect the position of moving objects is well known. It has also been previously proposed to detect the position of a target using so called "transmission of opportunity" wherein receivers detect transmissions, reflected from a target, originating from a transmitter. However in such systems, a direct line of sight of the receiver to the transmitter must also be provided (or a cable connection is needed) in order to create a reference in the receivers which can then be used for correlation with the delayed signal arriving via reflection from a target.

SUMMARY OF THE INVENTION

In certain telecommunication systems, transmitters use pre-stored codes as part of their modulation protocol. The inventors have determined that these codes can be advantageously used as templates for a correlator when correlating signals from a receiver reflected from a target in order to provide timing information to assist target location. This enables a method of detecting target positional information which obviates the need to have a direct line of sight from the receiver

DETAILED DESCRIPTION OF THE INVENTION

The invention comprises in a communication system wherein pre-stored codes are used in transmissions as part of the communication protocol, a method (FIG. 1) of determining the position of a target comprising the steps of: providing a transmitter to transmit a signal to the target (step 101), providing a plurality of receivers, in communication with each other, to receive signals reflected from said target (step 102), the receivers being time or phase synchronized; determining the time of arrival information of said code of reflected signal at each receiver (step 103) by continuously correlating said received signal with the pre-stored codes in the receiver; using information pertaining to the position of each receiver and with the information obtained, determining the target position (step 104).

The invention also includes a communication system wherein pre-stored codes are used in transmission as part of the communication protocol, a method (FIG. 2) of determining the position of a target comprising the steps of: providing a plurality of transmitters to transmit each a signal to the target (step 201), said transmitters being time or phase synchronized, providing a receiver to receive signals reflected from said target (step 202) and wherein said signals are sent out pre-set times known to the receiver; correlating said received signal with the pre-stored codes in each receiver to identify the transmitter of a particular signal (step 203); the receiver determining the time delay in receiving said signal (step 204) by subtracting the time of arrival of a pre-stored code of each reflected signal from each transmitter from the known time the pre-stored code was set, using information known to the receiver pertaining to the position of each transmitter and the with the timing information obtained, determining the target position (step 205).

DETAILED DESCRIPTION OF THE INVENTION

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Transmitters in many current communications systems are using pre-stored codes as part of their modulation protocol (e.g. for the purposes of channel equalisation or signal identification). The invention makes use of these pre-stored codes in a number of ways to detect the position of a target, where signals from transmitter(s) are reflected from the target to receivers. At the receivers detection of the codes by correlation allows the receiver to detect when the embedded code is received. This along with other information, such as transmitter or receiver location, enables target location to be determined. One main embodiment uses known information of when the codes are sent to provide useful timing information; this is because some codes are sent out at pre-determined time from a transmitter, these times also being known by a receiver.

In some systems, the codes will also include have a unique identification of a particular transmitter and a receiver may look up the location; i.e. the base station identity, contained within the signal can also be used in order to help sort out where each transmission came from. This eliminates any identification problems with respect to different signals from different base stations containing the same information producing correlations. In known telecommunication systems it is known to includes a modulated or coded portion unique to the transmitter.

EXAMPLE 1

Figure 1:
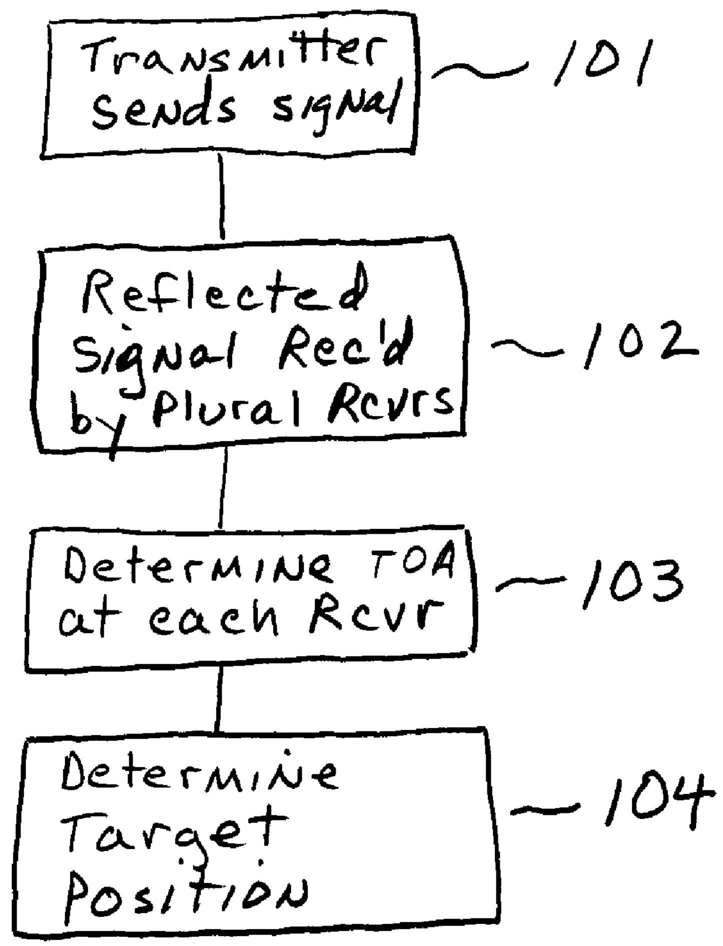
FIG. 1 is a flow diagram which illustrates a first embodiment of the method according to the invention.

In this example there is a single transmitter 1 and a number (i) of receivers 3, as shown in FIG. 1. An example may be a transmitter 1 used in mobile communications. The transmitted signal T includes one or more codes which are used in the protocol(s). A signal is transmitted and will be reflected ($R_{1-4}$) from a target 2 such as an aircraft to a plurality of receivers 3. Each receiver has the code pre-stored and continuously correlates this code with the received signal. When there is a peak in the correlation, the time T(i) is noted by each receiver i. These times are then sent to a processor, which may be located in one of the receivers. The processor used the times that the code was received and known information as to the positions of the receivers to calculate the position of the target. It is to be noted that such a system relies upon the code signal portion being defined within the protocol standard for the transmission type and as such is well defined and does not change. Also it is worth mentioning that the absolute time taken between transmission and reception of signal does not have to be known, just the (relative) times at each receiver when the reflected signal is received is important.

In other words the position where the correlation peak occurs will indicate the time at which that signal was received with respect to the reference template. This is especially useful when time difference of arrival techniques are used because in this case the absolute time that the transmission was sent is irrelevant, it is the relative time between signals (sent from the same location) arriving at different receiver locations that reveals the target position. It would be clear to a person skilled in the art how the resultant data can be used to determine target position e.g. triangulation.

Because the codes are known to be within the waveform by design, it is not now necessary to record those codes via a direct link to the transmitter. The codes are pre-ordained and as such may be pre-programmed into every receiver, thereby allowing the cross correlation process to occur irrespective of the data content of the specific transmitted signal. The receivers need to be synchronised.

EXAMPLE 2

Figure 2:
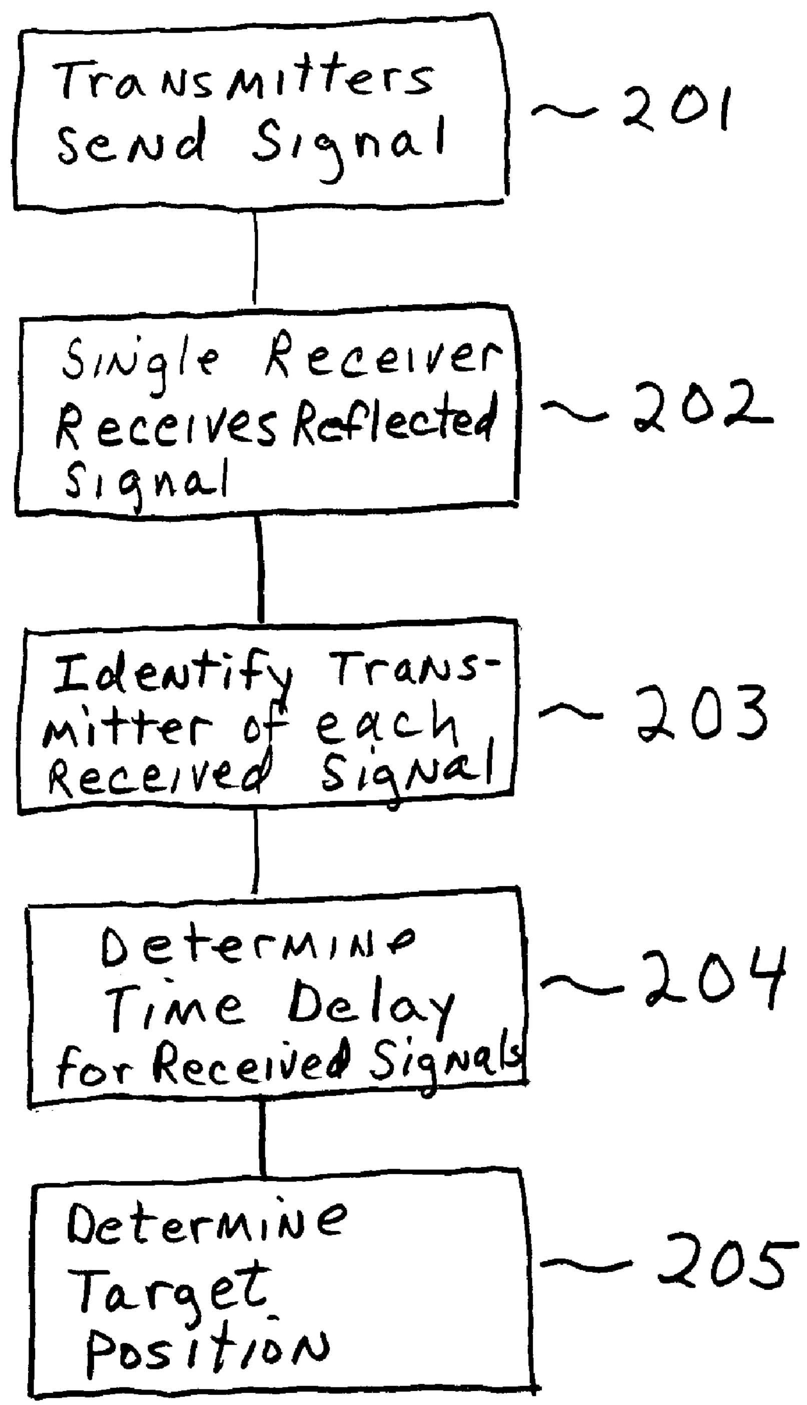
FIG. 2 is a flow diagram which illustrates a second embodiment of the method according to the invention.
Figure 3:
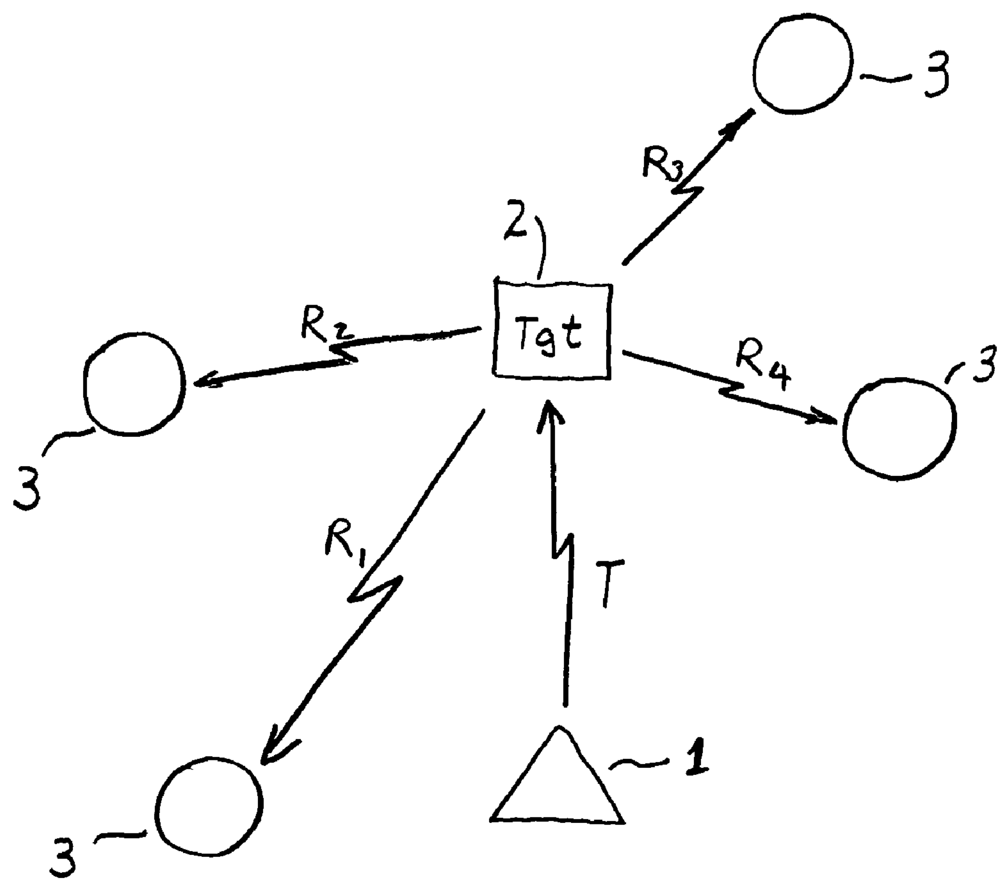
FIG. 3 is a schematic illustration of the transmitter and receivers for performing the first embodiment of the invention.
Figure 4:
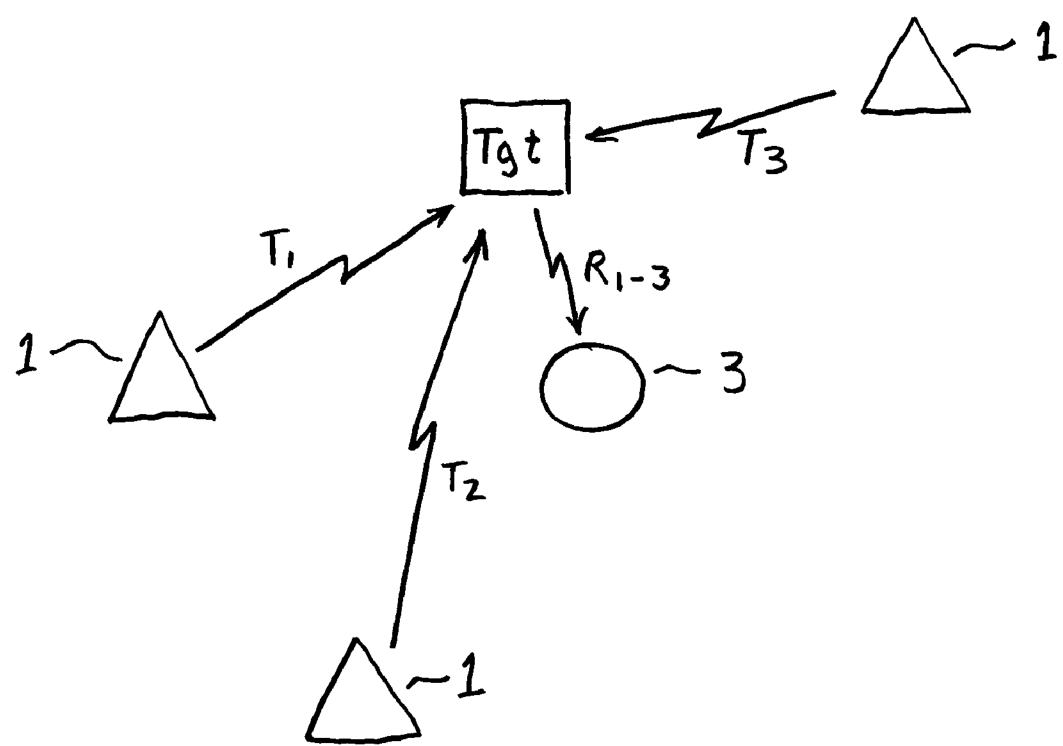
FIG. 4 is a schematic illustration of the transmitters and a single receiver for performing the second embodiment of the invention.

In this example there are a plurality of transmitters 1 and a single receiver 3, as shown in FIG. 2. The transmitters are synchronized. Each transmitter will send a signal which is received by the receiver. The receiver will again correlate incoming signals with a pre-stored code, and will make a note of the time that the prestored code is received for each transmitter. However in this case the absolute time between transmission and the reflected signal from the target being received is determined. The method makes use of the fact that embedded codes used in a protocol is in a fixed (known position) within the transmitted signal and the transmitter transmits at pre-set times (known to be receiver also). Thus if clocks of the transmitters are synchronized with that of the receiver the absolute time difference between signal sent and received (reflected via the target) can readily be determined by the receiver for each transmitter signal. With known data on the location of the transmitters the receiver can determine the target location.

In the example of a modern 3G cell phone systems use fully time synchronised networks so that every base station has a pre determined series of time and frequency slots when it transmits. If the receivers are then synchronised to the cellular network they know which base station has transmitted to within the accuracy of the synchronisation scheme 1 or 2 seconds. Now when the correlation process determines the time of arrival of the transmitted signal reflected from the target (in the same way as before) it can subtract the known transmission time to reveal the time of flight of the reflected signal. This time of flight information places the target on a locus that links all the positions where the range of the target with respect to the transmitter and receiver positions is a constant. To resolve the position on this locus of the target a second locus, with a different transmitter position is needed. Now the intersection of these loci defines the target position. Clearly, where signal reflections from multiple transmitter are received the estimate of target position becomes more accurate.

In a preferred embodiment of both examples, the signal from each transmitter preferably has unique identifying data so the receiver can discriminate the reflected signals in respect of which transmitter they came from. This reduces the number of parameters required such as the number of receivers/and or transmitter required for input to calculate position. Furthermore, if the receiver has pre-stored the geometric location of the identified transmitters i.e. the relative positions of the transmitters are known, the position of the target can be determined more readily.

Of course there are a number of different permutations and combinations which fall within the scope of the invention which would be clear to the skilled person.

In some instances it may be necessary where the transmitter is continuously sending out signals, for the receivers to discriminate between successive signals so that they are assessing the same signal, i.e. sent out at the same time.

Naturally the system may comprise of a plurality of receivers and a plurality of transmitters. Although the calculation of such a hybrid system would be more involved it would be clear to the skilled mathematician how the fdata can be used.

Furthermore the inventor has determined that current mobile telecommunications networks lend themselves very well to implement the above methods. The system is well adapted to use standard mobile telephone transmissions because of the aforementioned pre-stored codes used in mobile phone transmissions. For example in mobile phone modulation protocol there are included unique base station identification data and so called "training sequences" which are advantageously used in determination of target position. A GSM network operates typically with 200 KHz channels. Training codes (also called mid-amble) which are 26 bits long occur in every package i.e. every 660 microseconds. It is these codes that are used as the correlator reference in each receiver.

In one example of the invention standard telephone receivers are used and the received signal to an A/D converter occupying 200 KHz bandwidth is demodulated and the data package segmented into its training sequence and base station ID sequence. The training sequence is fed forward for correlation with the pre-stored training sequence in order to determine the time of arrival of the transmission. The base station identification is decoded and the bases station position can be determined (via pre-surveyed information for example), if this is needed for a particular implementation.

The invention claimed is:

1. A method of determining the position of a target using components in a wireless communication system in which pre-stored codes are included in transmissions of communications signals as part of a communication protocol, said method comprising the steps of:

a) providing a transmitter which transmits a communications signal;

b) providing a plurality of receivers, in communication with each other, which receive communications signals reflected from said target, the receivers being disposed at locations which are separate from said transmitter and separate from each other, and being time or phase synchronized;

c) determining a time of arrival information of said received communications signal at each receiver by continuously correlating said code in said received communications signal with the prestored codes in the receiver; and d) using information pertaining to the location of each receiver, together with the information obtained from step c), to determine the target position.

2. A method of determining the position of a target using components in a wireless communication system in which pre-stored codes are included in transmissions of communications signals as part of a communication protocol, said method comprising the steps of:

a) Providing a plurality of transmitters, each of which transmits a communications signal, said transmitters being time or phase synchronized;

b) providing a receiver which receives communications signals reflected from said target, said signals being sent by said transmitters at pre-set times which are known to the receiver, and said receiver being situated at a location separate from said transmitters, which are situated at locations separate from each other;

c) correlating codes in said received communications signal with pre-stored codes in each receiver to identify the transmitter and time of arrival of each particular communications signal;

d) the receiver determining a time delay in receiving each said communications signal by subtracting the time of arrival of said reflected communications signal from each transmitter from the known time at which time the pre-stored code was sent;

e) using information known to the receiver pertaining to the position of each transmitter, together with the time delay information obtained from step d), to determine the target position.

3. A method as claimed in claim 1 wherein transmitted signals includes a modulated or coded portion unique to the transmitter, which is used to identify the transmitter and hence its location for step (e).

4. A method as claimed in claim 1, wherein all the receivers communicate said time of arrival information and receiver identification to a central unit.

5. A method as claimed in claim 4 wherein said central unit is one of the receivers.

6. In a wireless communication system having a plurality of transmitters and a plurality of receivers, using combined information obtained via the methods of claim 1 to determine the location of the target.

7. A method as claimed in claim 1, wherein said wireless communications system comprises a system selected from the group consisting of a mobile phone, DAB, digital TV, digital Radio and a digital satellite system.

8. A method as claimed in claim 1, wherein said signal includes a mid-amble or a portion thereof or any unique sequence of data that is known to the receiver before transmission.

* * * * *